US008027411B2

(12) United States Patent
Sasaki et al.

(10) Patent No.: US 8,027,411 B2
(45) Date of Patent: *Sep. 27, 2011

(54) WIRELESS RECEIVER

(75) Inventors: Makoto Sasaki, Kanagawa (JP); Takashi Enoki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 932 days.

This patent is subject to a terminal disclaimer.

(21) Appl. No.: 11/995,197

(22) PCT Filed: Jul. 10, 2006

(86) PCT No.: PCT/JP2006/313709
§ 371 (c)(1),
(2), (4) Date: Jan. 9, 2008

(87) PCT Pub. No.: WO2007/007729
PCT Pub. Date: Jan. 18, 2007

(65) Prior Publication Data
US 2009/0207945 A1    Aug. 20, 2009

(30) Foreign Application Priority Data
Jul. 11, 2005    (JP) .................... 2005-202030

(51) Int. Cl.
*H04L 27/06* (2006.01)
(52) U.S. Cl. ........ 375/340; 375/324; 375/148; 375/150; 375/316; 375/260; 455/276.1; 455/278.1; 455/139; 455/42; 455/205; 455/23; 455/60; 455/67.17; 455/304
(58) Field of Classification Search .................. 375/148, 375/150, 316, 260, 340; 455/276.1, 278.1, 455/139, 42, 205, 23, 60, 67.17, 304
See application file for complete search history.

(56) References Cited

U.S. PATENT DOCUMENTS
5,390,348 A * 2/1995 Magin et al. ................. 455/63.1
7,769,358 B2 * 8/2010 Sasaki et al. ............... 455/276.1

FOREIGN PATENT DOCUMENTS
EP    1 724 941    11/2006
EP    1 724 956    11/2006
(Continued)

OTHER PUBLICATIONS

T. Enoki et al., "Jisedai Idotai Tsushinyo Musenbu no Jushin Kando Tokusei Kojo Kento—Iso Zatsuon Chancellor no Kaihatsu (2)-," 2005 Nen IEICE Communications Society Conference Koen Ronbunshu 1, Sep. 7, 20, p. 517.
T. Enoki et al., "Jisedai Idotai Tsushinyo Musenbu no Jushin Kando Tokusei Kojo Kento—Iso Zatsuon Chancellor no Kaihatsu (1) 6," 2005 Nen IEICE Communications Society Conference Koen Ronbunshu 1, Sep. 7, 2008, p. 516.

*Primary Examiner* — Chieh M Fan
*Assistant Examiner* — Siu Lee
(74) *Attorney, Agent, or Firm* — Dickinson Wright PLLC

(57) ABSTRACT

A wireless receiver having improved receiving characteristics is provided. The wireless receiver (151) is provided with an antenna (152) for receiving wireless signals including a modulation signal and a pilot signal having a frequency different from that of the modulation signal; a distributor (159) for distributing the received signal received by the antenna (152) in two directions; a band pass filter (160) for extracting a signal composition corresponding to the pilot signal, from the one signal distributed by the distributor (159); a delay corrector (162) for delaying the other signal distributed by the distributor (159); a quadrature demodulator (163) for multiplying the signal composition from the band pass filter (160) by the other signal delayed by the delay corrector (162) by frequency and for performing quadrature demodulation; and a synthesizer (165) provided before the quadrature demodulator (163), for synthesizing the signal component from the band pass filter (160) with a local oscillation signal having a frequency equivalent to the signal component.

3 Claims, 10 Drawing Sheets

FOREIGN PATENT DOCUMENTS

| | | |
|---|---|---|
| JP | 8-228189 | 9/1996 |
| JP | 2002/152158 | 5/2002 |
| WO | 2005/093962 | 10/2005 |
| WO | 2005/093979 | 10/2005 |

* cited by examiner

WIRELESS RECEIVER

TECHNICAL FIELD

The present invention relates to a radio receiving apparatus.

BACKGROUND ART

Conventionally, various measures are taken to provide a radio system with excellent phase noise characteristics. Patent Document 1 discloses an example of this radio system with excellent phase noise characteristics. This radio system has a local noise canceller shown in FIG. 1 to improve the phase noise characteristics.

The operation of this local noise canceller will be explained with reference to FIG. 1 and FIG. 2. FIG. 2 is a characteristic diagram showing the frequency characteristics of each component of the local noise canceller shown in FIG. 1.

As shown in FIG. 2(A), in an input signal, a modulated IF signal (BST-OFDM) and a pilot carrier (PILOT) are multiplexed and input phase noise (area shown by bold diagonal lines) is superimposed thereon.

Here, when the frequency of the input pilot carrier is $f_{PLT}$, the frequency of the input signal is $f_{sig}$, and the input phase noise is $\theta(t)$, input phase noise $\theta(t)$ is superimposed on $f_{PLT}$ and $f_{sig}$, and $f_{PLT}$ and $f_{sig}$ are represented as follows:

$f_{PLT} \angle \theta(t)$ $f_{sig} \angle \theta(t)$

Input signal A is then distributed by distributor 50, one signal is outputted to a pilot branch, and the other signal is outputted to a signal branch. In the pilot branch, one signal distributed by distributor 50 is band-limited by bandpass filter 51, and only a pilot carrier component passes and is extracted, and further limiter-amplified by limiter amplifier 52.

In this case, as shown in FIGS. 2(B and C), as for the frequency characteristics of output signal B from bandpass filter 51 and output signal C from limiter amplifier 52, an IF signal component is removed, and only the pilot carrier component and input phase noise $\theta(t)$ superimposed thereon remain.

In this case, a delay occurs at bandpass filter 51. If this delay time is $\tau_{BPF1}$, input phase noise $\theta(t-\tau_{BPF1})$ which is delayed by $\tau_{BPF1}$ is superimposed on input pilot carrier frequency $f_{PLT}$, and so $f_{PLT}$ is represented as follows:

$f_{PLT} \angle \theta(t-\tau_{BPF1})$

On the other hand, in the signal branch, local oscillation signal D is outputted from local oscillator 60. Here, as shown in FIG. 2(D), the frequency characteristics of local oscillation signal D outputted from local oscillator 60 consist of a signal of local oscillation frequency (LO) and in-system local oscillation phase noise superimposed thereon.

Here, when the local oscillation signal frequency in the system is $f_{LO}$ and the local oscillation signal phase noise in the system is $\phi(t)$, local oscillation signal phase noise $\phi(t)$ in the system is superimposed on local oscillation signal frequency $f_{LO}$ in the system, and $f_{LO}$ is represented as follows:

$f_{LO} \angle \phi(t)$

In the signal branch, the signal outputted from distributor 50 is frequency-converted (multiplied) by local oscillation signal D from local oscillator 60 at frequency converter 61, and signal E is outputted.

Here, as shown in FIG. 2(E), the frequency characteristics of signal E outputted from frequency converter 61 include a sum component and a difference component of input signal A and local oscillation signal D. Therefore, the relationship between each signal component included in signal E and phase noise to be superimposed is as follows:

$f_{PLT} - f_{LO} \angle \theta(t) - \phi(t)$ $f_{sig} - f_{LO} \angle \theta(t) - \phi(t)$ $f_{PLT} - f_{LO} \angle \theta(t) + \phi(t)$ $f_{sig} - f_{LO} \angle \theta(t) + \phi(t)$ Frequency-converted signal E is band-limited by bandpass filter 62 so that only the difference component passes through bandpass filter 62, and consequently, is outputted from bandpass filter 62 as signal F. As shown in FIG. 2(F), as for the frequency characteristics of signal F, the sum component of signal E is removed and only the difference component remains.

In this case, a delay occurs in bandpass filter 62, and if this delay time is $\tau_{BPF2}$, a delay of $\tau_{BPF2}$ is generated in the phase noise superimposed on the extracted difference component and the relationship between each signal component included in signal F and phase noise to be superimposed is represented as follows:

$f_{PLT} - f_{LO} \angle \theta(t-\tau_{BPF2}) - \phi(t-\tau_{BPF2})$ $f_{sig} - f_{LO} \angle \theta(t-\tau_{BPF2}) - \phi(t-\tau_{BPF2})$ Delay adjuster 63 adds a delay to signal F so that the delay is equivalent to the delay time at bandpass filter 51 in the pilot branch, and outputs the delayed signal as signal G.

Here, when the delay time at bandpass filter 62 is $\tau_{BPF2}$ with respect to delay time $\tau_{BPF1}$ of bandpass filter 51 and the delay time at delay adjuster 63 is $\Delta t$, delay adjuster 63 adds delay $\Delta t$ to signal F so that $\tau_{BPF1} = \tau_{BPF2} + \Delta t$ and equalizes the delay time difference from the pilot branch.

As a result, the frequency characteristics of signal G do not change and become as shown in FIG. 2(G), and the relationship between each signal component included in signal G and the phase noise to be superimposed is represented as shown below with delay $\Delta t$ added to the phase noise.

$f_{PLT} - f_{LO} \angle \theta(t-\tau_{BPF2}-\Delta t) - \phi(t-\tau_{BPF2}-\Delta t)$ $f_{sig} - f_{LO} \angle \theta(t-\tau_{BPF2}-\Delta t) - \phi(t-\tau_{BPF2}-\Delta t)$ Signal G of the signal branch and signal C of the pilot branch outputted from above described limiter amplifier 52 are frequency-converted (multiplied) by frequency converter 70 and outputted as signal H.

Here, as shown in FIG. 2(H), the frequency characteristics of signal H outputted from frequency converter 70 include a sum component and a difference component of signal G and signal C. Therefore, the relationship between each signal component included in signal H and phase noise to be superimposed is represented as shown below:

$f_{PLT} - (f_{PLT}-f_{LO}) \angle \theta(t-\tau_{BPF1}) - \{\theta(t-\tau_{BPF2}-\Delta t) - \phi(t-\tau_{BPF2}-\Delta t)\}$ $f_{PLT} - (f_{sig}-f_{LO}) \angle \theta(t-\tau_{BPF1}) - \{\theta(t-\tau_{BPF2}-\Delta t) - \phi(t-\tau_{BPF2}-\Delta t)\}$ $f_{PLT} + (f_{PLT}-f_{LO}) \angle \theta(t-\tau_{BPF1}) + \{\theta(t-\tau_{BPF2}-\Delta t) - \phi(t-\tau_{BPF2}-\Delta t)\}$ $f_{PLT} + (f_{sig}-f_{LO}) \angle \theta(t-\tau_{BPF1}) + \{\theta(t-\tau_{BPF2}-\Delta t) - \phi(t-\tau_{BPF2}-\Delta t)\}$ Here, as described above, delay adjuster 63 adds delay Δt so that;

$$\tau_{BPF1} = \tau_{BPF2} + \Delta t$$

and equalizes the delay time difference between the signal branch and the pilot branch, and therefore the equation can be simplified as follows:

$$f_{LO} \angle \phi(t - \tau_{BPF2} - \Delta t)$$

$$f_{LO} - (f_{sig} - f_{PLT}) \angle \phi(t - \tau_{BPF2} - \Delta t)$$

$$2 \times f_{PLT} - f_{LO} \angle 2 \times \theta(t - \tau_{BPF1}) - \phi(t - \tau_{BPF2} - \Delta t)$$

$$f_{PLT} + (f_{sig} - f_{LO}) \angle 2 \times \theta(t - \tau_{BPF1}) - \phi(t - \tau_{BPF2} - \Delta t)$$

Here, when attention is focused on the difference component, the frequency of the output signal component is frequency ($f_{LO}$) of the local oscillation signal in the system irrespective of the frequency of the input signal. That is, the frequency of the output signal component is constant. Furthermore, when attention is focused on the pilot carrier, the side band of the signal is inverted between input and output.

Furthermore, as for the phase noise of the output signal, inputted phase noise $\theta(x)$ is canceled, and, instead, the phase noise of the output signal becomes phase noise $\phi(x)$ of the local oscillation signal in the system. That is, when phase noise $\phi(x)$ of the local oscillation signal in the system is substantially small, the phase noise of the input signal is substantially reduced and outputted.

Thus, bandpass filter 71 performs band limitation on signal H frequency-converted at frequency converter 70 so that only the difference component and only the signal component pass, and outputs signal I. As shown in FIG. 2(I), as for the frequency characteristics of signal I, the sum component and pilot carrier components of difference component in signal H are removed, and only the signal component of the difference component remains. Further, the relationship between the signal included in signal I and phase noise to be superimposed is represented as follows:

$$f_{LO} - (f_{sig} - f_{PLT}) \angle \phi(t - \tau_{BPF2} - \Delta t)$$

According to the principle of frequency synchronization and noise cancellation of the above described local noise canceller, even if, for example, a frequency deviation occurs in the input signal, an output signal having the frequency according to the local oscillation frequency with high frequency accuracy and high stability generated by local oscillator 60 is obtained, so that it is possible to eliminate the frequency deviation of the input signal.

Furthermore, as for phase noise of the output signal, phase noise $\theta(x)$ superimposed on the input signal is canceled, only phase noise $\phi(x)$ of the local oscillation signal in the system remains, and therefore, if phase noise $\theta(x)$ of the local oscillation signal in the system is substantially small, phase noise of the input signal is substantially reduced and outputted.
Patent Document 1: Japanese Patent Application Laid-Open No. 2002-152158

DISCLOSURE OF INVENTION

Problems to be Solved by the Invention

However, in the conventional radio system, phase noise $\phi(x)$ generated at local oscillator 60 is not canceled, phase noise increases at a rate of 20*log (corresponding to frequency multiplication), and therefore, when the frequency of local oscillator 60 is high, there is a problem that communication quality deteriorates due to the influence of phase noise $\phi(x)$.

Thus, in the previous application (Japanese Patent Application Laid-Open No. 2005-312021), the inventors proposed a communication system having: a radio transmitting apparatus that transmits a radio signal in which a modulated signal carrying no signal on a central frequency and a pilot signal having the same central frequency as the above described central frequency are multiplexed together; and a radio receiving apparatus including an antenna that receives a radio signal in which a modulated signal carrying no signal on a central frequency and a pilot signal having the same central frequency as the above described central frequency are multiplexed together, a distributor that distributes the received signal received at the antenna into two directions, a bandpass filter that extracts a signal component corresponding to the pilot signal having the same central frequency as the central frequency of one signal distributed by the distributor, a delay adjuster that adds a delay to the other signal distributed by the distributor, and a quadrature demodulator that performs frequency multiplication on the signal component corresponding to the pilot signal extracted by the bandpass filter by the other signal to which the delay is added by the delay adjuster, and that performs quadrature demodulation.

However, although, in the above described conventional radio system and the communication system proposed by the inventors, a spectrum of a received signal appears as a large peak when the propagation environment has static characteristics, when the propagation environment has dynamic characteristics, the received signal level may deteriorate by approximately 10 to 30 dB due to the influence of fading. In this case, the reception level of a pilot signal also deteriorates, and in the worst case, the pilot signal cannot be extracted and the reception characteristics may deteriorate.

It is therefore an object of the present invention to provide a radio receiving apparatus that improves reception characteristics.

Means for Solving the Problem

The radio receiving apparatus of the present invention adopts a configuration including: an antenna that receives a radio signal Including a modulated signal and a pilot signal having a frequency different from a frequency of the modulated signal; a distributing section that distributes the received signal received by the antenna into two directions; an extracting section that extracts a signal component corresponding to the pilot signal from one signal distributed by the distributing section; a delay adding section that adds a delay to the other signal distributed by the distributing section; a quadrature demodulating section that performs frequency multiplication on the signal component from the extracting section by the other signal to which the delay is added by the delay adding section, and then, performs quadrature demodulation; and a combining section that is provided before the quadrature demodulating section and combines the signal component from the extracting section with an oscillation signal having the same frequency as the signal component.

Advantageous Effect of the Invention

According to the present invention, it is possible to provide a radio receiving apparatus that improves reception characteristics.

BEST MODE FOR CARRYING OUT THE INVENTION

Figure 1:
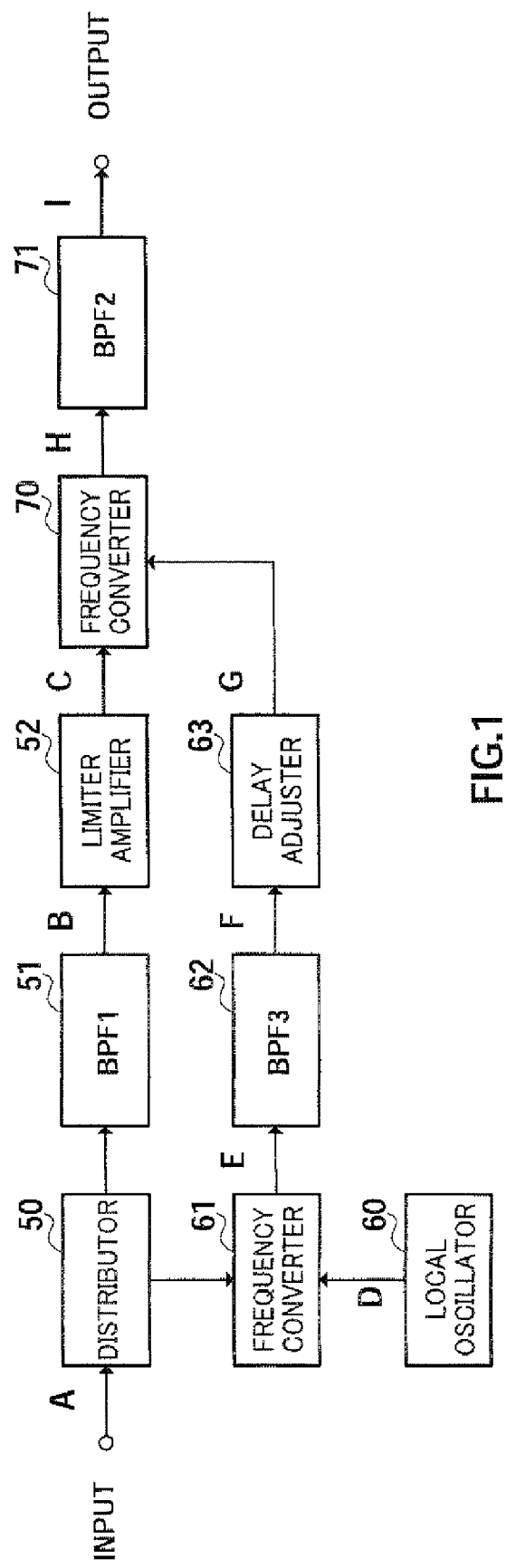
FIG. 1 is a block diagram showing the configuration of a local noise canceller provided for a conventional radio system.
Figure 2:
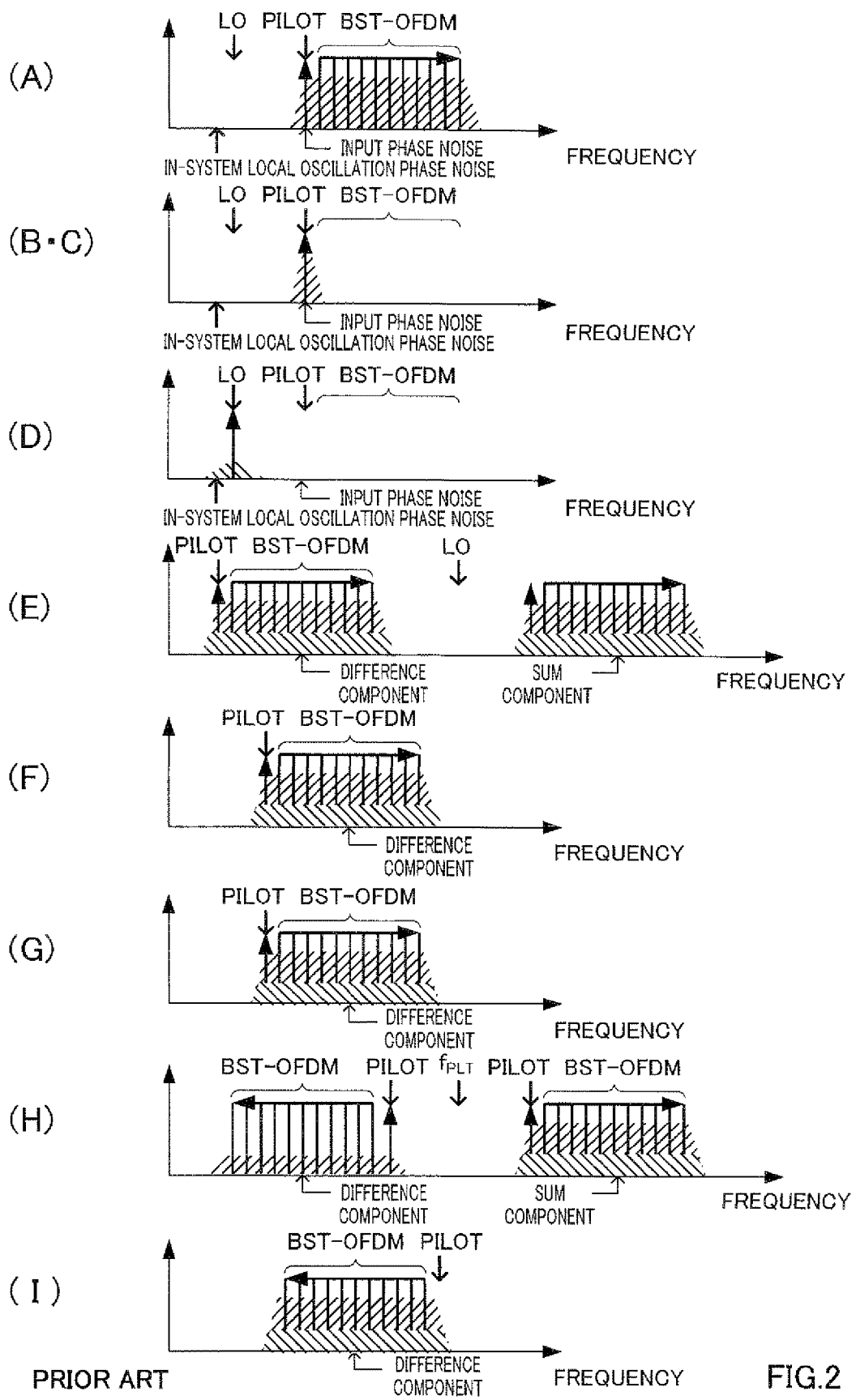
FIG. 2 is a characteristic diagram showing the frequency characteristics of each component of the local noise canceller in FIG. 1.

Hereinafter, embodiments of the present invention will be described in detail with reference to the attached drawings. In the embodiments, the same components are assigned the same reference numerals and overlapping explanations thereof will be omitted.

Embodiment 1

First, a radio system according to this embodiment will be explained with reference to the attached drawings.

Figure 3:
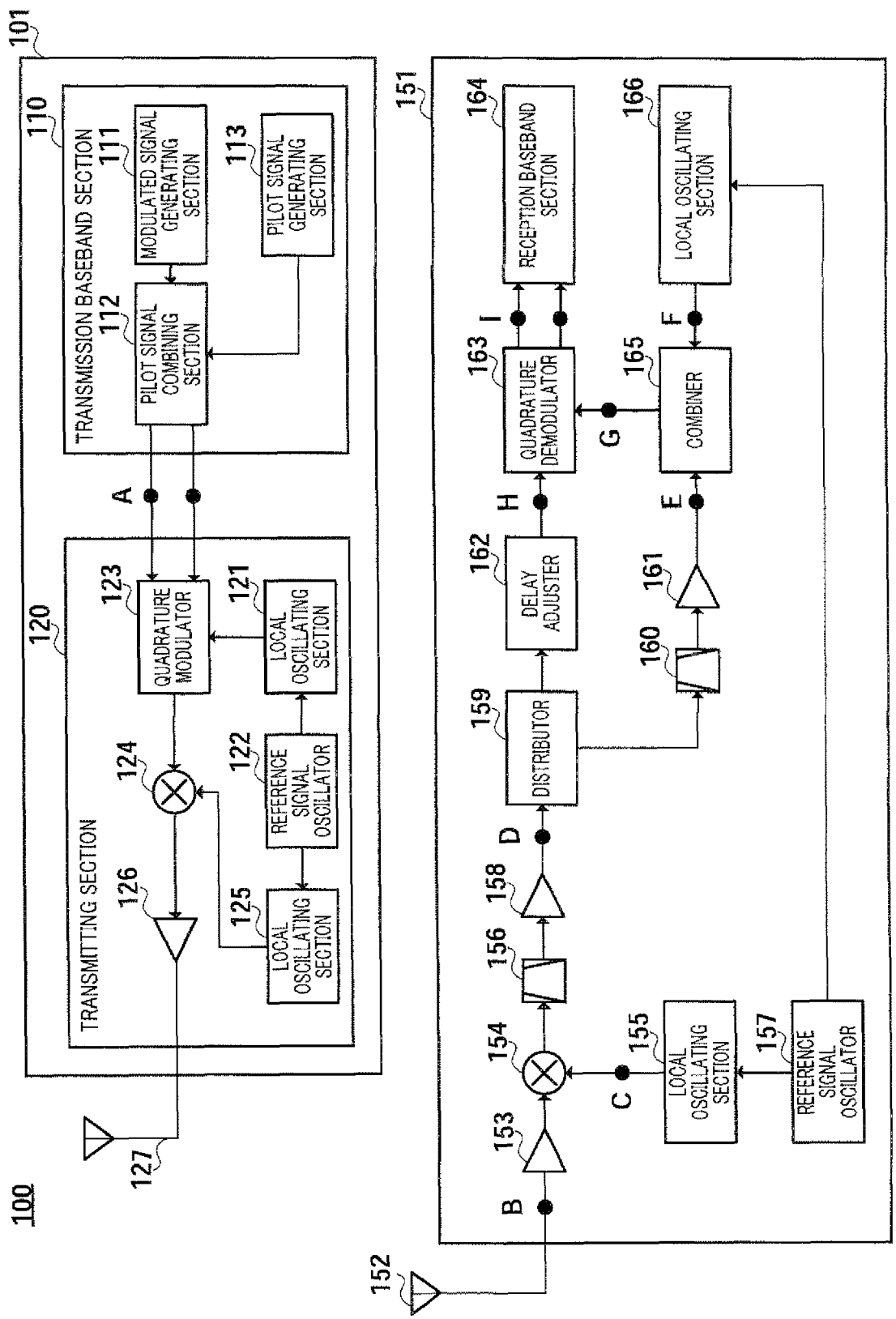
FIG. 3 is a block diagram showing the configuration of a radio system according to Embodiment 1 of the present invention.

FIG. 3 is a block diagram showing the configuration of a radio system according to this embodiment. As shown in FIG. 3, radio system 100 has radio transmitting apparatus 101 and radio receiving apparatus 151.

This radio transmitting apparatus 101 includes transmission baseband section 110 that generates a baseband signal and transmitting section 120 that applies predetermined processing to the baseband signal and transmits the signal as an RF signal.

In this transmission baseband section 110, modulated signal generating section 111 generates a modulated signal and outputs the signal to pilot signal combining section 112. Here, the modulated signal will be explained as multicarrier CDMA, but any modulated signal can be used if no signal is carried on a central frequency in the frequency domain. For example, an OFDM signal or the like can be used.

This pilot signal combining section 112 combines the modulated signal (M-CDMA) received from modulated signal generating section 111 and a pilot signal (PILOT) received from pilot signal generating section 113 and outputs the combined signal to transmitting section 120.

The pilot signal is designed to be provided at the center of the modulated signal in the frequency domain, and, when the frequency of the pilot signal is $f_{PILOT}$, $f_{PILOT}=0$ [Hz].

On the other hand, in transmitting section 120, local oscillating section 121 generates a local oscillation signal using a reference signal generated by reference signal oscillator 122 and outputs the local oscillation signal to quadrature modulator 123.

Quadrature modulator 123 performs quadrature modulation on the combined signal of the modulated signal and pilot signal outputted from pilot signal combining section 112 of above described transmission baseband section 110, using the local oscillation signal from local oscillating section 121 and outputs the result to multiplier 124.

Multiplier 124 converts the signal quadrature-modulated by quadrature modulator 123 to a radio signal, using a local oscillation signal received from local oscillating section 125. This radio signal is amplified by amplifier 126 and then transmitted through antenna 127. Here, local oscillating section 125 generates a local oscillation signal using a reference signal outputted from reference signal oscillator 122. Generation of the local oscillation signal at local oscillating section 121 is in synchronization with generation of the local oscillation signal at local oscillating section 125.

On the other hand, in radio receiving apparatus 151, antenna 152 receives a radio signal transmitted from radio transmitting apparatus 101. This received radio signal is amplified by amplifier 153 and then outputted to multiplier 154.

Multiplier 154 performs frequency conversion on the radio signal amplified by amplifier 153, using a local oscillation signal outputted from local oscillating section 155 and outputs the result to bandpass filter 156. Further, local oscillating section 155 oscillates the local oscillation signal using a reference signal outputted from reference signal oscillator 157.

Bandpass filter 156 extracts only a signal of a desired frequency from the signal frequency-converted at multiplier 154. The signal extracted by bandpass filter 156 is amplified by amplifier 158 and then outputted to distributor 159.

Distributor 159 distributes the signal received from bandpass filter 156 through amplifier 158 into two routes of a modulated signal branch and a pilot branch.

In the pilot branch, bandpass filter 160 extracts only a pilot signal component from the signal distributed by distributor 159. This extracted pilot signal component is amplified by amplifier 161, then inputted to combiner 165 and combined with a local oscillation signal outputted from local oscillating section 166. Local oscillating section 166 outputs a local oscillation signal using the reference signal outputted from reference signal oscillator 157.

The pilot signal component and the local oscillation signal outputted from combiner 165 are inputted to quadrature demodulator 163.

On the other hand, in the modulated signal branch, delay adjuster 162 delays the signal received from distributor 159 in synchronization with the signal that reaches quadrature demodulator 163 through the pilot branch, and outputs the result to quadrature demodulator 163.

Quadrature demodulator 163 multiplies the signals received from the pilot branch and modulated signal branch, performs quadrature demodulation on the multiplication result and outputs the demodulation result to reception baseband section 164.

Figure 4:
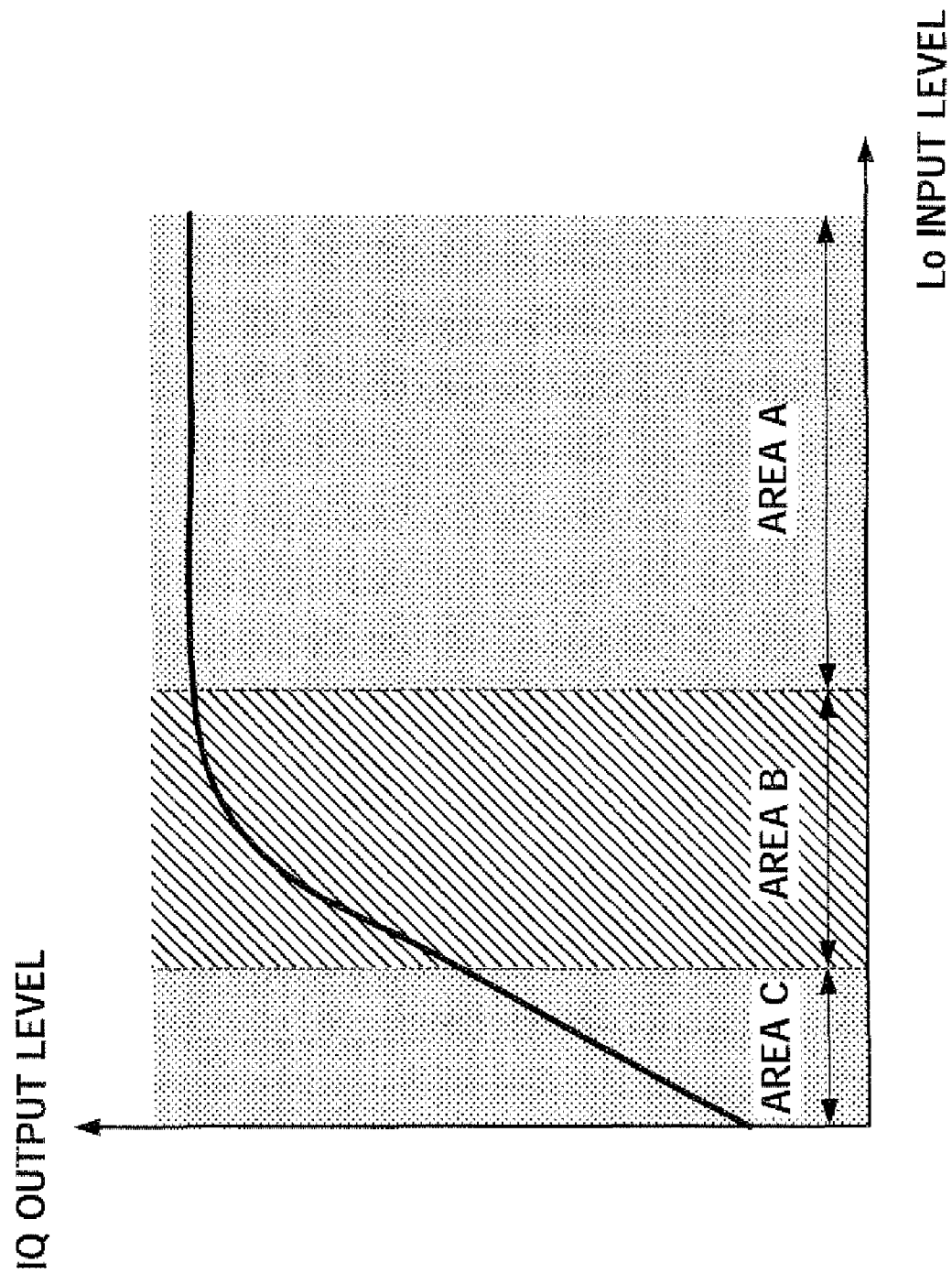
FIG. 4 shows the relationship between an input level and IQ output level of the quadrature demodulator in FIG. 3.

FIG. 4 shows a relationship between a Lo (local) input level and IQ output level of this quadrature demodulator 163. As shown in FIG. 4, within the range of area A where the Lo input level is substantially large, quadrature demodulator 163 can perform demodulation at the constant IQ output level. On the other hand, when the Lo input level is within the range of area B, the IQ output level of quadrature demodulator 163 deteriorates. Within the range of area C where the IQ level falls to or below a level required to perform demodulation, quadrature demodulator 163 cannot demodulate the modulated signal Here, a pilot signal is inputted to the local part of quadrature demodulator 163, and so the "Lo input level" in this embodiment refers to the power Level of the pilot signal component. When the power level of the pilot signal component is a substantially large level, the Lo input level becomes area A in FIG. 4 and good reception characteristics can be obtained. That is, good reception characteristics can be obtained if the pilot signal component has an ideal power level. However, if the power level of the pilot signal component falls within the range of area C in FIG. 4 due to the influence of fading, demodulation cannot be performed and the reception characteristics significantly deteriorate.

Next, the operation of radio system 100 will be explained with reference to FIG. 3 to FIG. 5.

Figure 5:
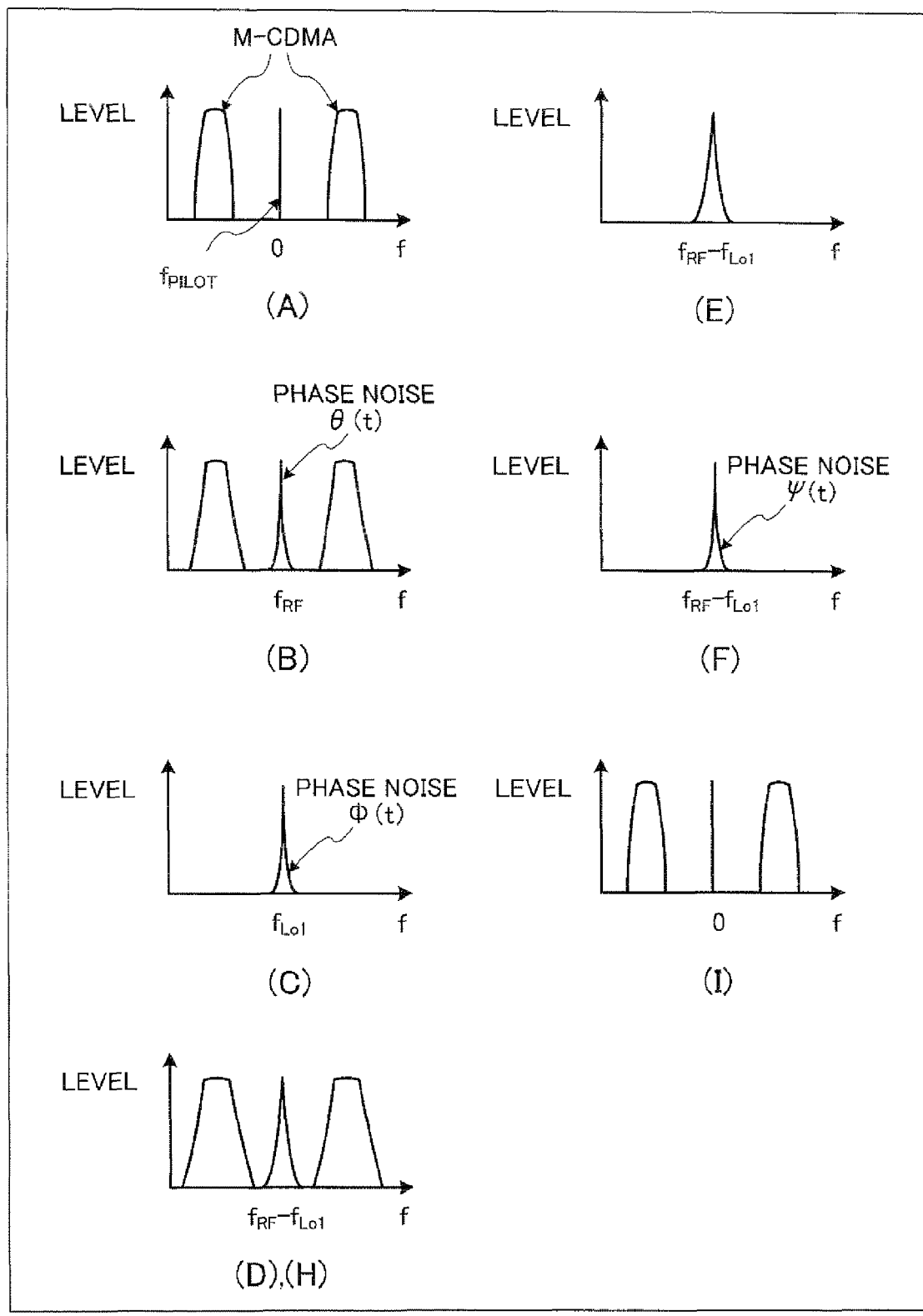
FIG. 5 is a characteristic diagram showing frequency characteristics of each signal in the radio system in FIG. 3.

FIG. 5 is a characteristic diagram showing frequency characteristics of each signal of radio system 100. FIGS. 5(A) to (I) show the frequency characteristics of the signals corresponding to the parts marked by alphabets in FIG. 3.

Combined signal A of the modulated signal and pilot signal outputted from transmission baseband section 110 has the frequency characteristics shown in FIG. 5(A). As described above, the pilot signal here is provided at the center of the modulated signal in the frequency domain, and, when the frequency of the pilot signal is $f_{PILOT}$, $f_{PILOT}=0$ [HZ].

Combined signal A is frequency-converted to a radio signal at transmitting section 120 and outputted from antenna 127.

Radio frequency $f_{RF}$ of the modulated signal and radio frequency $f_{RF\_PILOT}$ of the pilot signal included in the radio signal outputted from antenna 127 are represented as follows:

$$f_{RF}=f_{CDMA}+f_{Lo1}+f_{Lo2}$$

$$f_{RF\_PIPOT}=f_{PILOT}+f_{Lo1}+f_{Lo2}$$

Here, the frequency of the modulated signal generated at modulated signal generating section 111 is $f_{CDMA}$, the frequency of the local oscillation signal oscillated at local oscillating section 125 is $f_{Lo1}$, and the frequency of the local oscillation signal oscillated at local oscillating section 121 is $f_{Lo2}$.

Here, in transmitting section 120, phase noise of local oscillating section 121 and phase noise of local oscillating section 125 are superimposed on combined signal A at quadrature modulator 123 and multiplier 124, respectively, and outputted as a radio signal. Furthermore, phase noise is also superimposed on the radio signal in a channel after the signal is outputted from antenna 127 until the signal is received at antenna 152.

Therefore, when the sum total of phase noise superimposed in transmitting section 120 and the channel is $\theta(t)$, radio signal B received at antenna 152 has the frequency characteristics shown in FIG. 5(B) and is represented as follows:

$$f_{RF}\angle\theta(t)$$

$$f_{RF\_PILOT}\angle\theta(t)$$

Radio signal B received at antenna 152 is amplified at amplifier 153 and frequency-converted at multiplier 154. Here, local oscillating section 155 oscillates a local signal having phase noise $\phi(t)$, and therefore this local signal has frequency characteristics as shown in FIG. 5(C) and is represented as follows:

$$f_{Lo1}\angle\phi(t)$$

Therefore, phase noise $\phi(t)$ of local oscillating section 155 is superimposed on the signal frequency-converted at multiplier 154, and the signal is outputted to bandpass filter 156.

The bandwidth of this bandpass filter 156 is set so as to extract the frequencies of the difference component outputted at multiplier 154, that is, $f_{RF}-f_{Lo1}$ and $f_{RF\_PILOT}-f_{Lo1}$. Therefore, signal D outputted from amplifier 158 has frequency characteristics shown in FIG. 5(D) and is represented as follows:

$$f_{RF}-f_{Lo1}\angle\theta(t)-\phi(t)$$

$$f_{RF\_PILOT}-f_{Lo1}\angle\theta(t)-\phi(t)$$

Next, signal D is distributed at distributor 159, one signal is outputted to the modulated signal branch, and the other signal is outputted to the pilot branch.

In the pilot branch, bandpass filter 160 is set so as to extract only the pilot signal component, and so bandpass filter 160 extracts only the pilot signal component from distributed signal D and outputs the result to amplifier 161. In this case, the pilot signal component has the frequency characteristics shown in FIG. 5(E).

The pilot signal component outputted from amplifier 161 is combined with the signal outputted from local oscillating section 166 shown in FIG. 5(F) at combiner 165 and inputted to the local part of quadrature demodulator 163. Here, output frequency $f_{Lo2}$ of local oscillating section 166 is the same as the frequency of the pilot signal component, and so $f_{Lo2}=f_{RF\_PILOT}-f_{Lo1}$. Furthermore, local oscillating section 166 has phase noise $\psi(t)$ Furthermore, the output level of local oscillating section 166 is set to a level within the range of area B in FIG. 4.

In this case, pilot signal component G passes through bandpass filter 160, amplifier 161 and combiner 165, and consequently, delay $\tau_1$ is superimposed on pilot signal component G. Therefore, output signal G of combiner 165 is represented as follows:

$$f_{RF\_PILOT}-f_{Lo1}\angle\theta(t-\tau_1)-\phi(t-\tau_1)$$

$$f_{RF\_PILOT}-f_{Lo1}\angle\psi(t)$$

On the other hand, in the modulated signal branch, such a delay that satisfies $\Delta t=\tau_1$ is superimposed on signal D at delay adjuster 162. Therefore, signal H outputted from delay adjuster 162 has the frequency characteristics as shown in FIG. 5(H) and can be represented by the following equation:

$$f_{RF}-f_{Lo1}\angle\theta(t-\Delta t)-\phi(t-\Delta t)$$

Signal H and signal G are multiplied at quadrature demodulator 163 and then subjected to quadrature demodulation. Therefore, signal I outputted from quadrature demodulator 163 has the frequency characteristics as shown in FIG. 5(I) and can be represented by the following equation:

$$(f_{RF}-f_{Lo1})-(f_{RF\_PILOT}-f_{Lo1})\angle\theta(t-\tau_1)-\phi(t-\tau_1)-\{\theta(t-\Delta t)-\phi(t-\Delta t)\}(f_{RF}-f_{Lo1})-f_{Lo2}\angle\theta(t-\tau_1)-\phi(t-\tau_1)-\psi(t)$$

These equations are simplified using a condition of $f_{PILOT}=0$ Hz and $\Delta t=\tau_1$ as follows:

$$f_{CDMA}\angle 0 \qquad \text{(Equation 1)}$$

$$f_{CDMA}\angle\theta(t-\tau_1)-\phi(t-\tau_1)-\psi(t) \qquad \text{Equation 2)}$$

That is, quadrature demodulator 163 can demodulate two signals of the demodulated signal represented by equation 1 and the demodulated signal represented by equation 2 which have different phase noise.

Here, when the power level of pilot signal component E is within the range of area A in FIG. 4, the demodulated signal represented by equation 1 becomes predominant, and therefore the signal to be demodulated becomes a demodulated signal represented by equation 1.

$$f_{CDMA}\angle 0$$

Figures 6A, 6B, 6C:
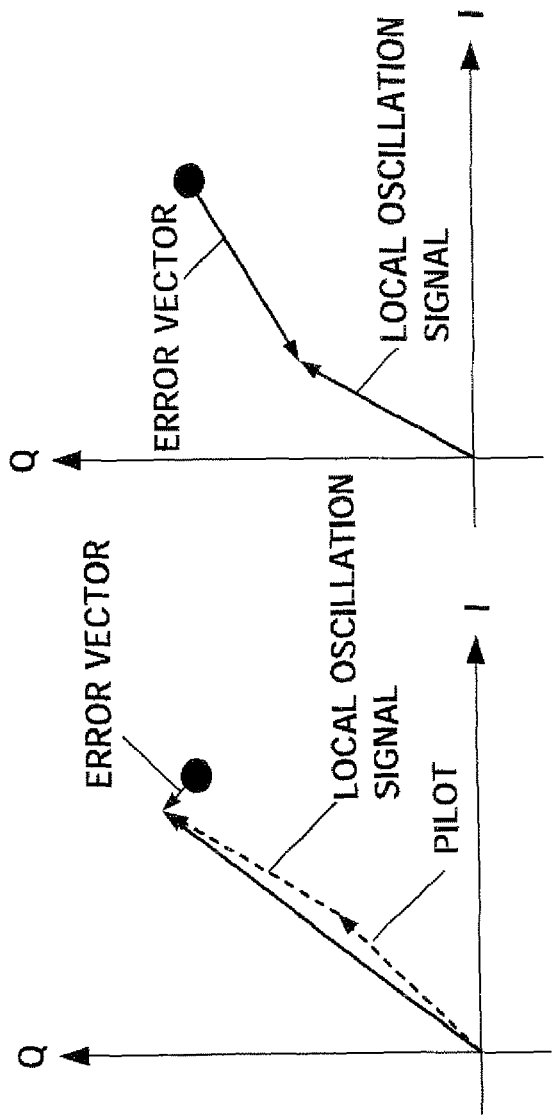
FIG. 6 illustrates the demodulation characteristics of the quadrature demodulator in FIG. 3.

This means that phase noise superimposed at transmitting section 120, the channel and local oscillating section 155, is completely canceled and the modulated signal generated at modulated signal generating section 111 is demodulated at radio receiving apparatus 151. When shown with a conceptual diagram of constellation shown in FIG. 6, an ideal value or symbol in the vicinity thereof can be obtained as shown in FIG. 6(A). That is, if pilot signal component E is at an ideal power level, an ideal value or symbol in the vicinity thereof can be obtained.

Figure 7:
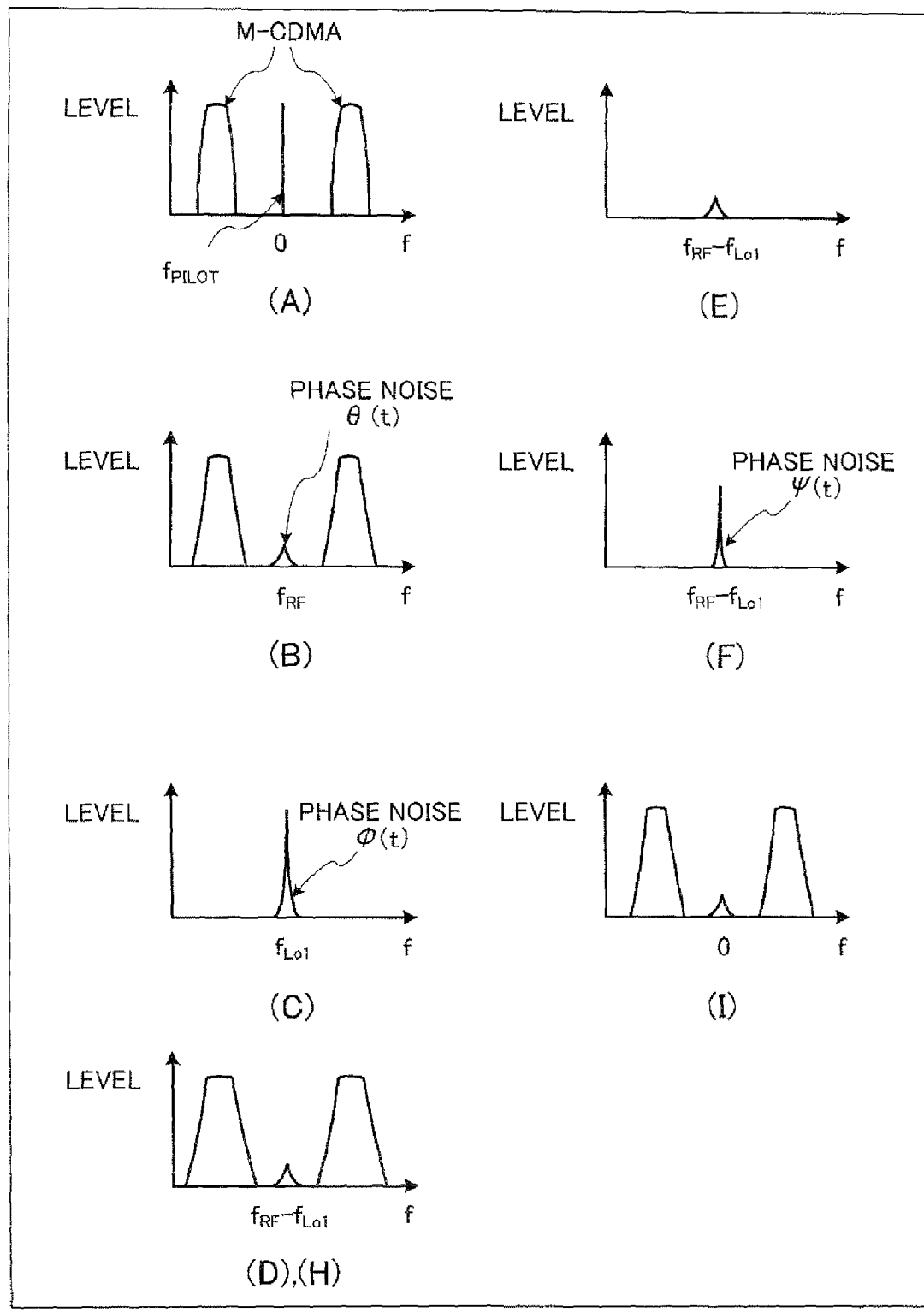
FIG. 7 is a characteristic diagram showing the frequency characteristics of each signal in the radio system in FIG. 3.

On the other hand, when the level of pilot signal E is within the range of area C in FIG. 4, the demodulated signal represented by equation 2 becomes predominant, and therefore the signal to be demodulated becomes a demodulated signal represented by equation 2. FIG. 7 shows drawings corresponding to FIG. 5 when the power level of the pilot signal component is as low as that in area C in FIG. 4.

This means that phase noise is superimposed at transmitting section 120, the channel and local oscillating section 155 and local oscillating section 166 and the modulated signal generated at modulated signal generating section 111 is demodulated at radio receiving apparatus 151, and therefore a demodulated signal having the same phase noise as in the case of using a normal superheterodyne scheme can be obtained. Furthermore, the constellation in this case becomes as shown in FIG. 6(C).

Furthermore, if the level of pilot signal E is within the range of area B in FIG. 4, two demodulated signals having different phase noise are demodulated. The constellation in this case becomes as shown in FIG. 6(B), and the magnitude of the error vector is smaller than the error vector in FIG. 6(C).

Figure 8:
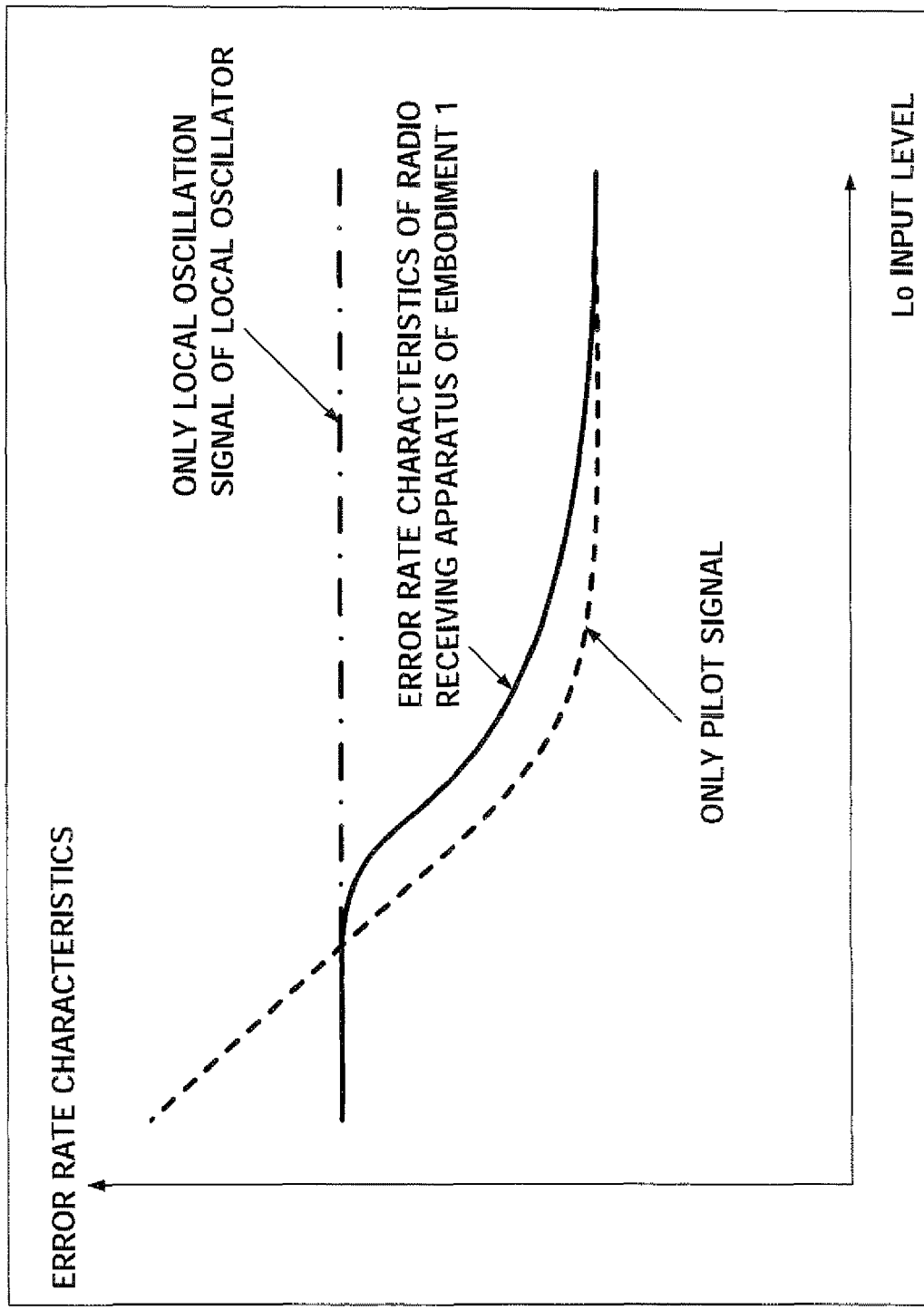
FIG. 8 illustrates error characteristics in the radio system in FIG. 3.

Therefore, the error rate characteristics of quadrature demodulator 163 with respect to the Lo input level is as shown in FIG. 8. That is, when the Lo input level is high, the characteristics are equivalent to the case where only the pilot signal component is used for the Lo input, and, on the other hand, when the Lo input level is low, the characteristics are equivalent to the case where only the local oscillation signal of local oscillating section 166 is used. That is, reception characteristics equivalent or superior to a generally used superheterodyne scheme can be realized. In FIG. 8, the error rate characteristics deteriorate in the vertical axis direction from the origin, and the Lo input level increases in the horizontal axis direction from the origin.

In this way, according to Embodiment 1, radio receiving apparatus 151 has: antenna 152 that receives a radio signal including a modulated signal and a pilot signal having a frequency different from the frequency of the modulated signal; distributor 159 that distributes the received signal received at antenna 152 into two directions; bandpass filter 160 that extracts the signal component corresponding to the pilot signal from one signal distributed at distributor 159; delay adjuster 162 that adds a delay to the other signal distributed at distributor 159; quadrature demodulator 163 that performs frequency multiplication on the signal component from bandpass filter 160 by the other signal to which a delay is added at delay adjuster 162 and then, performs quadrature demodulation; and combiner 165 that is provided before quadrature demodulator 163 and that combines the signal component from bandpass filter 160 with a local oscillation signal having a frequency corresponding to the signal component.

By so doing, the signal obtained by combining the pilot signal component with the local oscillation signal having a frequency equivalent to the frequency of the pilot signal component, is subjected to frequency multiplication by the received signals to which a delay is added, and then, subjected to quadrature demodulation, and therefore even when the power level of the pilot signal component is at a level difficult to be used for demodulation, a local oscillation signal having a frequency equivalent to the frequency of the pilot signal component can be used, so that it is possible to prevent significant deterioration of the reception characteristics even when the pilot signal level deteriorates due to the influence of fading and the like, and improve the reception characteristics.

The radio signal received at antenna 152 is a multiplex signal obtained by multiplexing the modulated signal carrying no signal on the central frequency with a pilot signal having the same central frequency as the above described central frequency.

By so doing, the received radio signal is obtained by multiplexing a modulated signal carrying no signal on the central frequency with a pilot signal having the same central frequency as the above described central frequency, and local oscillating section 60 and frequency converter 61 in the signal branch of the local noise canceller shown in the conventional example are not required, and therefore phase noise included in the local oscillation signal generated at this local oscillating section 60 is not carried on the signal (signal F) of the signal branch. For this reason, the phase error that occurs in the system can also be completely removed, so that a radio system with excellent phase noise characteristics can be realized.

Embodiment 2

In Embodiment 1, combiner 165 combines a pilot component extracted in the pilot branch with a local oscillation signal having the same frequency as the pilot component and a power level capable of obtaining reception characteristics equivalent or superior to the reception characteristics of the conventional reception scheme at quadrature demodulator 163 even when the power level of the extracted pilot component is low, and then inputs the result to quadrature demodulator 163. In contrast with this, in Embodiment 2, whether or not the local oscillation signal is combined is selected depending on the power level of the extracted pilot component.

Figure 9:
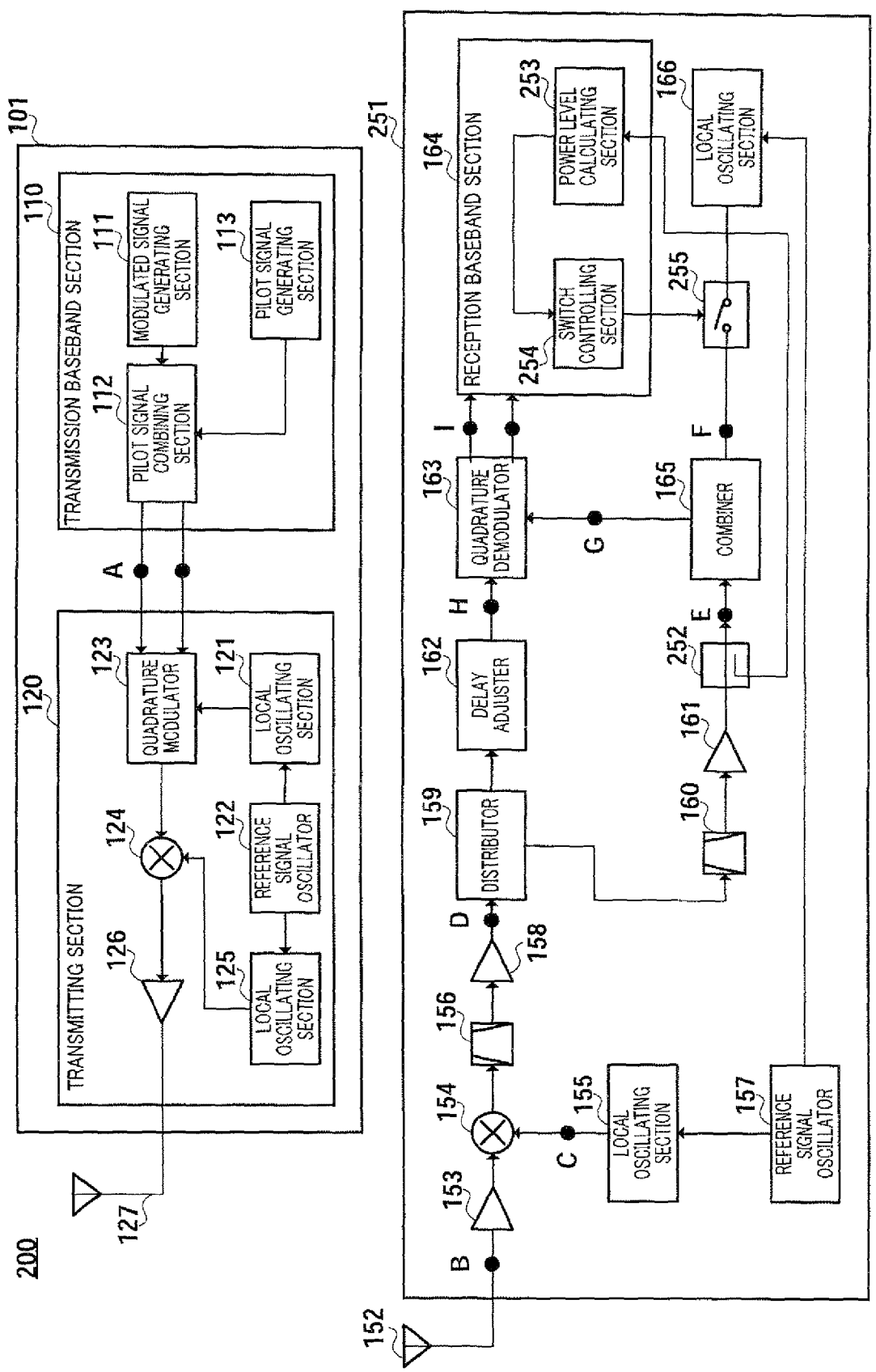
FIG. 9 is a block diagram showing the configuration of a radio system according to Embodiment 2.

FIG. 9 is a block diagram showing the configuration of a radio system according to this embodiment. As shown in FIG. 9, radio system 200 has radio transmitting apparatus 101 and radio receiving apparatus 251. This radio receiving apparatus 251 includes directional coupler 252, power level calculating section 253, switch controlling section 254 and swatch 255.

A pilot signal component extracted at bandpass filter 160 in the pilot branch is amplified at amplifier 161 and then inputted to combiner 165 through directional coupler 252.

Switch 255 is provided between combiner 165 and local oscillating section 166, and, when this switch 255 is closed, a local oscillation signal of local oscillating section 166 is inputted to combiner 165. Switch 255 is opened or closed under the control of switch controlling section 254.

Power level calculating section 253 inputs a pilot signal component from directional coupler 252, calculates a power level thereof and outputs the result to switch controlling section 254.

Switch controlling section 254 controls opening and closing of switch 255 according to the power level of the pilot signal component calculated at power level calculating section 253.

Next, the operation of radio system 200 will be explained Explanations of parts having the same operations as in Embodiment 1 will be omitted.

Radio signal B received at antenna 152 is amplified at amplifier 153 and is frequency-converted at multiplier 154. Here, local oscillating section 155 oscillates a local signal having phase noise φ(t), and so this local signal has the frequency characteristics as shown in FIG. 5(C) and is represented as follows:

$$f_{Lo1} \angle \phi(t)$$

For this reason, phase noise φ(t) of local oscillating section 155 is superimposed on the signal frequency-converted at multiplier 154 and the result is outputted to bandpass filter 156.

The bandwidth of this bandpass filter 156 is set so as to extract frequencies of the difference components outputted from multiplier 154, that is, $f_{RF}-f_{Lo1}$ and $f_{RF\_PILOT}-f_{Lo1}$. Therefore, signal D outputted from amplifier 158 has the frequency characteristics shown in FIG. 5(D) and is represented as follows:

$$f_{RF}-f_{Lo1} \angle \theta(t)-\phi(t)$$

$$f_{RF\_PILOT}-f_{Lo1} \angle \theta(t)-\phi(t)$$

Next, signal D is distributed at distributor 159, one signal is outputted to a modulated signal branch, and the other signal is outputted to a pilot branch.

In the pilot branch, bandpass filter 160 is set so as to extract only the pilot signal component, and so bandpass filter 160 extracts only the pilot signal component from distributed signal D and outputs the result to amplifier 161. The output of amplifier 161 is inputted to power level calculating section 253 through directional coupler 252, and power level calculating section 253 calculates a power level of the pilot signal component. The following operation varies depending on the power level of this pilot signal component.

1) When the power level of the pilot signal corresponds to area A and B in FIG. 4

When the power level of the pilot signal corresponds to area A and B in FIG. 4, switch controlling section 254 performs control so that switch 255 opens. In this case, It is also possible to perform control so as to turn OFF the power supply to local oscillating section 166 and thereby save power.

In this case, the pilot signal component has frequency characteristics shown in FIG. 5(E). The pilot signal component outputted from directional coupler 252 is inputted to the local part of quadrature demodulator 163 through combiner 165. Here, the frequency characteristics of signal G is the same as in FIG. 5(E).

In this case, after pilot signal component E passes through bandpass filter 160, amplifier 161, directionality coupler 252 and combiner 165, delay $\tau_2$ is superimposed on pilot signal component E. For this reason, output signal G of combiner 165 is represented as follows:

$$f_{RF\_PILOT}-f_{Lo1} \angle \theta(t-\tau_2)-\phi(t-\tau_2)$$

On the other hand, in the modulated signal branch, such a delay that satisfies $\Delta t=\tau 2$ is superimposed on signal D at delay adjuster 162. Therefore, signal H outputted from delay adjuster 162 has the frequency characteristics as shown in FIG. 5(H) and can be represented by the following equation:

$$f_{RF}-f_{Lo1} \angle \theta(t-\Delta t)-\phi(t-\Delta t)$$

Next, signal G and signal H are multiplied at quadrature demodulator 163 and then subjected to quadrature demodulation. Therefore, signal I outputted from quadrature demodulator 163 has the frequency characteristics as shown in FIG. 5(I) and can be represented by the following equation:

$$(f_{RF}-f_{Lo1})-(f_{RF\_PILOT}-f_{Lo1}) \angle \theta(t-\tau_1)-\phi(t-\tau_1)-\{\theta(t-\Delta t)-\phi(t-\Delta t)\}(f_{RF}-f_{Lo1})-f_{Lo2}$$

This equation is simplified using a condition of $f_{PILOT}=0$ Hz and $\Delta t=\tau_2$ as follows:

$$f_{CDMA} \angle 0$$

This means that phase noise superimposed at transmitting section 120, the channel and local oscillating section 155, is completely canceled, and a modulated signal generated at modulated signal generating section 111 is demodulated at radio receiving apparatus 251. When shown with a conceptual diagram of constellation shown in FIG. 6, a symbol for an ideal value as shown in FIG. 6(A) can be obtained.

2) When the power level of a pilot signal corresponds to area C in FIG. 4

When the power level of a pilot signal corresponds to area C in FIG. 4, switch controlling section 254 performs control so that switch 255 closes. In this case, it is also possible to perform control to turn OFF the power supply to amplifier 161 simultaneously and thereby save power.

In this case, the pilot signal component has the frequency characteristics shown in FIG. 7(E). The pilot signal component outputted from directional coupler 252 is combined with the signal outputted from local oscillating section 166 shown in FIG. 7(F) at combiner 165 and inputted to the local part of quadrature demodulator 163. Here, the frequency characteristics of signal G become the same as in FIG. 7(F). Therefore, output signal C of combiner 165 is represented as follows:

$$f_{RF\_PILOT}-f_{Lo1} \angle \psi(t)$$

On the other hand, in the modulated signal branch, such an arbitrary delay that satisfies $\Delta t=\tau_3$ is superimposed on signal D at delay adjuster 162. Therefore, signal H outputted from delay adjuster 162 has frequency characteristics as shown in FIG. 7(H) and can be represented by the following equation:

$$f_{RF}-f_{Lo1} \angle \theta(t-\Delta t)-\phi(t-\Delta t)$$

Signal G and signal H are multiplied at quadrature demodulator 163 and then subjected to quadrature demodulation. Therefore, signal G outputted from quadrature demodulator 163 has the frequency characteristics as shown in FIG. 7(I) and can be represented by the following equation:

$$(f_{RF}-f_{Lo1})-f_{Lo2} \angle \theta(t-\tau_3)-(t-\tau_3)-\psi(t)$$

This equation is simplified using a condition $f_{PILOT}=0$ Hz and $\Delta t=\Delta 3$ as follows:

$$f_{CDMA} \angle \theta(t-\tau_3)-\phi(t-\tau_3)-\psi(t)$$

This means that phase noise superimposed at transmitting section 120, the channel, local oscillating section 155 and local oscillating section 166, is superimposed, and a modulated signal generated at modulated signal generating section 111 is demodulated at radio receiving apparatus 251, and a demodulated signal having the same phase noise as in the case of using a superheterodyne scheme can be obtained. The constellation in this case becomes as shown in FIG. 6(C).

Figure 10:
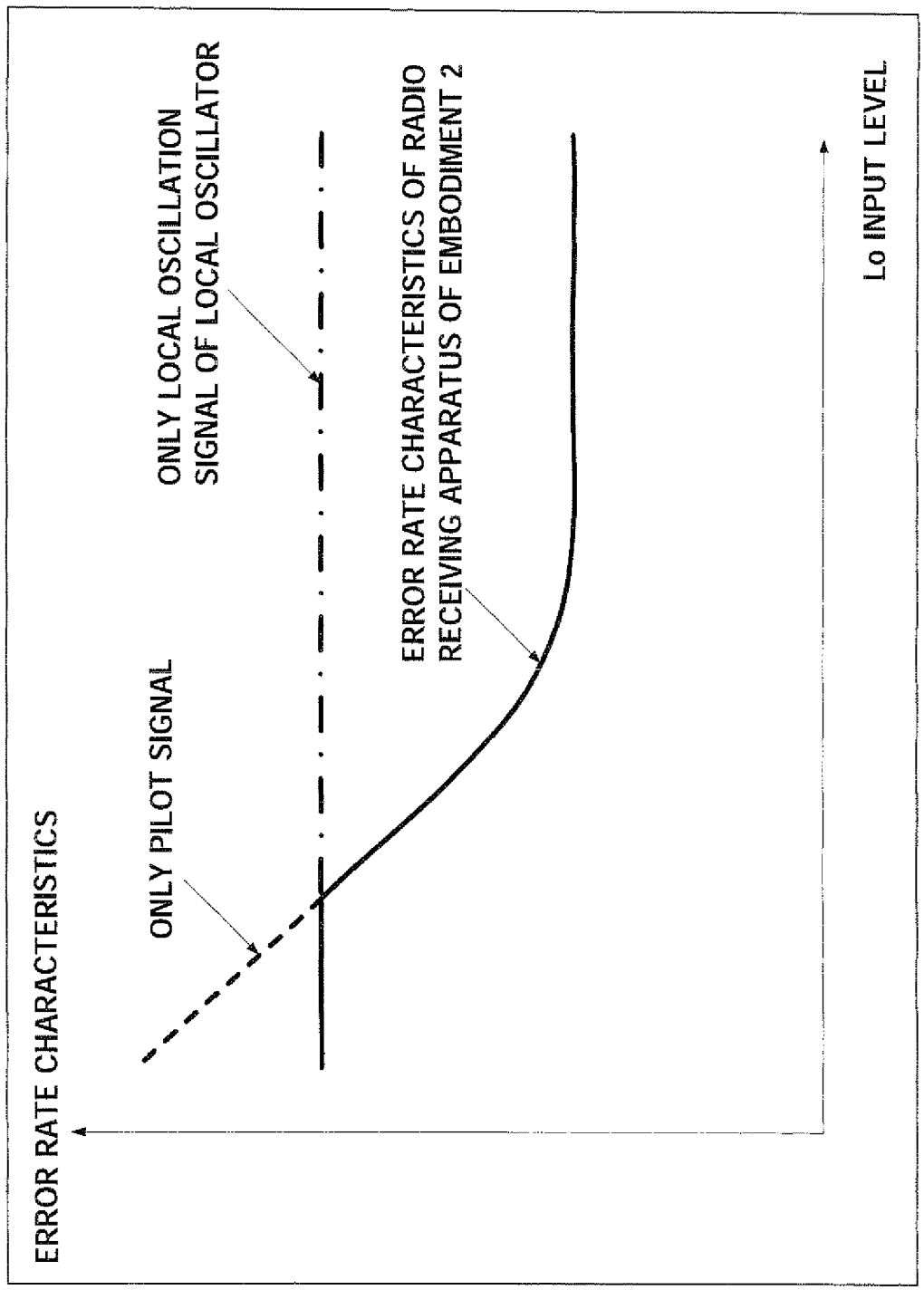
FIG. 10 illustrates the error characteristics of the radio system in FIG. 9.

From above, the error rate characteristics of quadrature demodulator 163 with respect to the Lo input level becomes as shown in FIG. 10, and, when the Lo input level is high, the characteristics become equivalent to the case where a pilot signal is used for the Lo input and the reception characteristics can be further improved compared to the case in Embodiment 1 shown in FIG. 8.

Thus, according to Embodiment 2, radio receiving apparatus 251 has: antenna 152 that receives a radio signal including a modulated signal and a pilot signal having a frequency different from the frequency of the modulated signal; distributor 159 that distributes the received signal received at antenna 152 into two directions; bandpass filter 160 that extracts a signal component corresponding to the pilot signal from the one signal distributed at distributor 159; delay adjuster 162 that adds a delay to the other signal distributed at distributor 159; quadrature demodulator 163 that performs frequency multiplication on the signal component from bandpass filter 160 by the other signal to which the delay is added at delay adjuster 162, and then, performs quadrature demodulation; combiner 165 that is provided before quadrature demodulator 163 and combines the signal component from bandpass filter 160 with a local oscillation signal having a frequency corresponding to the signal component; and further, power level calculating section 253 that calculates the power level of the signal component from bandpass filter 160; and switch controlling section 254 that stops the input of the local oscillation signal to combiner 165 according to the calculated power level.

By so doing, the signal obtained by combining a pilot signal component with a local oscillation signal having a frequency corresponding to the pilot signal component according to the power level of the pilot signal component, is subjected to frequency multiplication by a received signal to which a delay is added, and then, is subjected to quadrature demodulation, and therefore, even when the power level of the pilot signal component is at a level difficult to be used for demodulation, a local oscillation signal having a frequency equivalent to the frequency of the pilot signal component can be used, so that it is possible to prevent significant deterioration of the reception characteristics even when the pilot signal level deteriorates due to the influence of fading and the like, and improve the reception characteristics.

The present application is based on Japanese Patent Application No. 2005-202030, filed on Jul. 11, 2005, the entire content of which is expressly incorporated by reference herein.

INDUSTRIAL APPLICABILITY

The radio receiving apparatus according to the present invention is suitable for use to improve the reception characteristics.

The invention claimed is:

1. A radio receiving apparatus comprising:
   an antenna that receives a radio signal including a modulated signal and a pilot signal having a frequency different from a frequency of the modulated signal;
   a distributing section that distributes the received signal received by the antenna into two directions;
   an extracting section that extracts a signal component corresponding to the pilot signal from one signal distributed by the distributing section;
   a delay adding section that adds a delay to another signal distributed by the distributing section;
   a quadrature demodulating section that performs frequency multiplication on the signal component from the extracting section by the other signal to which the delay is added by the delay adding section, and then, performs quadrature demodulation; and
   a combining section that is provided before the quadrature demodulating section and combines the signal component from the extracting section with an oscillation signal having a same frequency as the signal component.

2. The radio receiving apparatus according to claim 1, further comprising:
   a calculating section that calculates a power level of a signal component from the extracting section; and
   a stopping section that stops an input of the oscillation signal to the combining section according to the calculated power level.

3. The radio receiving apparatus according to claim 1, wherein the radio signal received at the antenna is a multiplex signal obtained by multiplexing a modulated signal carrying no signal on a central frequency, with a pilot signal having a same central frequency as the central frequency.

* * * * *